United States Patent
Wu et al.

(10) Patent No.: US 11,355,100 B2
(45) Date of Patent: Jun. 7, 2022

(54) METHOD AND ELECTRONIC DEVICE FOR PROCESSING AUDIO, AND NON-TRANSITORY STORAGE MEDIUM

(71) Applicant: Beijing Xiaomi Pinecone Electronics Co., Ltd., Beijing (CN)

(72) Inventors: Zelun Wu, Beijing (CN); Shiqi Cui, Beijing (CN); Qiaojing Xie, Beijing (CN); Chen Wei, Beijing (CN); Bin Qin, Beijing (CN); Gang Wang, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 0 days.

(21) Appl. No.: 17/033,715

(22) Filed: Sep. 26, 2020

(65) Prior Publication Data
US 2021/0327411 A1    Oct. 21, 2021

(30) Foreign Application Priority Data
Apr. 15, 2020 (CN) .......................... 202010295558.2

(51) Int. Cl.
*G06F 40/30* (2020.01)
*G10L 15/02* (2006.01)
*G10L 15/18* (2013.01)

(52) U.S. Cl.
CPC .......... *G10L 15/02* (2013.01); *G10L 15/1815* (2013.01)

(58) Field of Classification Search
CPC ...... G10L 15/02; G10L 15/1815; G06F 40/30
See application file for complete search history.

(56) References Cited

U.S. PATENT DOCUMENTS

| 6,836,760 B1 * | 12/2004 | Bellegarda | G10L 15/1822 704/238 |
| 7,657,433 B1 * | 2/2010 | Chang | G10L 15/08 704/252 |
| 11,010,561 B2 * | 5/2021 | Bellegarda | G06F 40/30 |

(Continued)

OTHER PUBLICATIONS

Horiguchi Shota et al: "Multimodal Response Obligation Detection with Unsupervised Online Domain Adaptation", INTERSPEECH 2019. [Online]Sep. 15, 2019 (Sep. 15, 2019), pp. 4180-4184. XP055786479 ISCA DOI: 10.21437/Interspeech. 2019-1313, the whole document.

(Continued)

*Primary Examiner* — Jakieda R Jackson
(74) *Attorney, Agent, or Firm* — Syncoda LLC; Feng Ma

(57) ABSTRACT

A method for processing information includes that: a current audio is acquired, and a current text corresponding to the current audio is acquired; feature extraction is performed on the current audio through a speech feature extraction portion in a semantic analysis model, to obtain a speech feature of the current audio; feature extraction is performed on the current text through a text feature extraction portion in the semantic analysis model, to obtain a text feature of the current text; semantic classification is performed on the speech feature and the text feature through a classification portion in the semantic analysis model, to obtain a classification result; and recognition of the current audio is rejected in response to the classification result indicating that the current audio is to be rejected for recognition.

17 Claims, 8 Drawing Sheets

(56) References Cited

U.S. PATENT DOCUMENTS

| | | | |
|---|---|---|---|
| 2005/0033574 A1* | 2/2005 | Kim | G10L 15/22 704/251 |
| 2014/0163960 A1* | 6/2014 | Dimitriadis | G10L 25/48 704/9 |
| 2014/0280173 A1* | 9/2014 | Scholtes | G06N 20/00 707/740 |
| 2014/0337370 A1* | 11/2014 | Aravamudan | G06F 16/433 707/759 |
| 2017/0193097 A1* | 7/2017 | Cramer | G06N 3/0454 |
| 2017/0329820 A1* | 11/2017 | Park | G06F 16/24522 |
| 2018/0075844 A1* | 3/2018 | Kim | G10L 17/04 |
| 2018/0268818 A1* | 9/2018 | Schoenmackers | G10L 15/26 |
| 2018/0276454 A1* | 9/2018 | Han | G06K 9/4628 |
| 2018/0330729 A1* | 11/2018 | Golipour | G10L 15/16 |
| 2019/0042900 A1* | 2/2019 | Smith | G06T 7/11 |
| 2019/0187787 A1* | 6/2019 | White | G06F 3/013 |
| 2020/0043504 A1* | 2/2020 | Li | G10L 17/02 |
| 2020/0081908 A1* | 3/2020 | Huang | G06F 40/30 |
| 2020/0126584 A1* | 4/2020 | Huang | G10L 15/1815 |
| 2020/0152200 A1* | 5/2020 | Xu | G06F 3/04883 |
| 2020/0228476 A1* | 7/2020 | Fejes | H04L 12/413 |
| 2020/0320253 A1* | 10/2020 | Tian | G06K 9/6273 |
| 2020/0342314 A1* | 10/2020 | Liao | G06N 3/08 |
| 2021/0158086 A1* | 5/2021 | Salamon | G06K 9/6231 |

OTHER PUBLICATIONS

Akhtiamov Oleg et al: "Speech and Text Analysis for Multimodal Addressee Detection in Human-Human-Computer Interaction", INTERSPEECH 2017, [Online] Aug. 20, 2017 (Aug. 20, 2017), pp. 2521-2525, XP055786474. ISCA DOI: 10.21437/Interspeech. 2017-501, abstract; figure 1, section 2.1, section 4.3.

Akhtiamov Oleg et al: "Gaze, Prosody and Semantics: Relevance of Various Multimodal Signals to Addressee Detection in Human-Human-Computer Conversations", (Aug. 25, 2018). ICIAP: International Conference on Image Analysisand Processing, 17th InternationalConference, Naples. Italy, Sep. 9-13, 2013. Proceedings: Lecture Notes in Computer Science: Lect. Notes ComputerSpringer, Berlin, Heidelberg, pp. 1-10, XP047484960, ISBN: 978-3-642-17318-9, abstract, section 3.4, figure 1.

Gu Yue et al: "Speech ntention Classification with Multimodal Deep Learning", Apr. 11, 2017 (Apr. 11, 2017), ICIAP International Conference on Image Analysisand Processing, 17th International Conference, Naples, Italy, Sep. 9-13, 2013. Proceedings: Tlecture Notes in Omputer Science; Lect. Notes Computer, Springer, Berlin, Heidelberg, pp. 260-262. XP047410918, ISBN: 978-3-642-17318-9, abstractx section 4.2; figures 2, 3, section 4.3; figure 1.

Phan Huy et al: "Robust Audio Event Recognition with 1-Max Pooling Convolutional Neural Networks", INTERSPEECH 2016, [Online] vol. 2016, Jun. 22, 2016 (Jun. 22, 2016), pp. 3653-3657, XP055786819, ISSN: 1990-9772, DOI: 10.21437/Interspeech. 2016-123, abstract.

Qiao chao et al: "A New Method of Region Embedding for Text Classification". ICLR 2018 conference, Apr. 30, 2018 (Apr. 30, 2018), XP055786832, abstract, section 1.

Annervaz K M et al: "Learning beyond datasets: Knowledge Graph Augmented Neural Networks for Natural anguage Processinq". Arxiv.Org, Cornell University Library, 201 Olin Library Cornell University Thaca, NY 14853, Feb. 16, 2018 (Feb. 16, 2018), XP081231971, abstract.

European Search Report in the European application No. 20200538.5, dated Mar. 26, 2021.

* cited by examiner

| Audio | ASR result | Text-speech conversion result | Reject response | |
|---|---|---|---|---|
| First audio | Innocent people get into trouble on account of others' misfortune | Find encyclopedic information about "Innocent people get into trouble on account of others' misfortune" for you | Response | |
| Second audio | Everyone has reached the moat, the meandering water is used up, and the more dead it is, the loss and harm suffered by the age of the female beast | Amazing, you got me, please try to put it another way | Reject for recognition | Self-talk |
| Third audio | Alive | Find encyclopedic information about "alive" for you | Reject for recognition | Incomplete audio |

| Audio | ASR result | Text-speech conversion result | Reject response | |
|---|---|---|---|---|
| Fourth audio | Amap | Good | Response | |
| Fifth audio | Change an alarm clock to eight | Alarm clock is on, let's change it | Reject for recognition | Irrelevant human voice |

| Audio | ASR result | Text-speech conversion result | Reject response | |
|---|---|---|---|---|
| Sixth audio | China | Find encyclopedic information about "China" for you | Reject for recognition | False awaking |
| Seventh audio | Navigate | Please tell me where to navigate | Reject for recognition | False awaking |

FIG. 4

METHOD AND ELECTRONIC DEVICE FOR PROCESSING AUDIO, AND NON-TRANSITORY STORAGE MEDIUM

CROSS-REFERENCE TO RELATED APPLICATION

This application claims priority to Chinese Patent Application No. 202010295558.2 filed on Apr. 15, 2020, the disclosure of which is hereby incorporated by reference in its entirety.

BACKGROUND

In the process of human-computer dialogue, full duplex may be used for achieving smooth, natural and anthropomorphic conversation experience. At present, a full duplex technology may be applied to various application scenarios, such as "one-time wake-up, continuous conversation", and "listening while speaking, interrupting at any time" in audio interactions, so as to make the process of audio interaction smoother.

SUMMARY

The present disclosure relates generally to the field of computer communications, and more specifically to a method and device for processing information, and a storage medium.

According to a first aspect of some embodiments of the present disclosure, a method for processing information is provided, which is applied to an electronic device, and may include that:

a current audio is acquired, and a current text corresponding to the current audio is acquired;

features extraction is performed on the current audio through a speech feature extraction portion in a semantic analysis model, to obtain a speech feature of the current audio;

features extraction is performed on the current text through a text feature extraction portion in the semantic analysis model, to obtain a text feature of the current text;

semantic classification is performed on the speech feature and the text feature through a classification portion in the semantic analysis model, to obtain a classification result; and recognition of the current audio is rejected in response to the classification result indicating that the current audio is to be rejected for recognition.

According a second aspect of some embodiments of the present disclosure, a device for processing information is provided, which may include:

a processor; and memory storing instructions executable by the processor; the processor is configured to perform, during executing the instructions, the method for processing information in the first aspect.

According a third aspect of some embodiments of the present disclosure, a non-transitory computer-readable storage medium is provided. When instructions in the storage medium are executed by a processor of a device for processing information, the device can perform operations in the method for processing information in the first aspect.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

FIG. 4 is a schematic diagram of recognition reject/ response results obtained based on an audio file according to some embodiments of the present disclosure.

DETAILED DESCRIPTION

Figure 1:
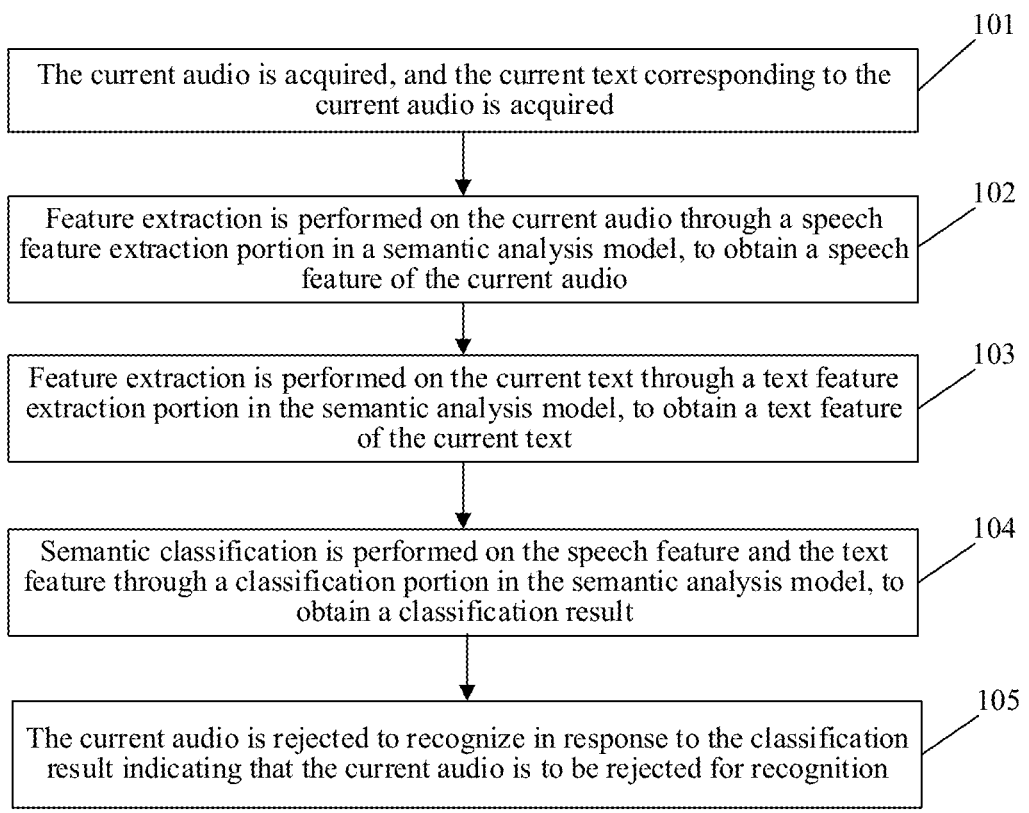
FIG. 1 is a flowchart of a method for processing information according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Audio interaction technologies can be applied to various electronic devices, such as a mobile terminal, a television, a smart speaker and so on. In the process of audio interaction based on an electronic device, the number of audio requests received by electronic device is extremely large, but not all of the received audio requests are requests that a user really wants to express. At this time, there may be false awakenings and false responses, for example, responding to a received unrelated audio request and user's unconscious self-talk.

FIG. 1 is a flowchart of a method for processing information according to some embodiments of the present disclosure. As illustrated in FIG. 1, the method may mainly include the following operations.

In S101, a current audio is acquired, and a current text corresponding to the current audio is acquired.

In S102, feature extraction is performed on the current audio through a speech feature extraction portion in a semantic analysis model, to obtain a speech feature of the current audio.

In S103, feature extraction is performed on the current text through a text feature extraction portion in the semantic analysis model to obtain a text feature of the current text.

In S104, semantic classification is performed on the speech feature and the text feature through a classification portion in the semantic analysis model, to obtain a classification result.

In S105, recognition of the current audio is rejected in response to the classification result indicating that the current audio is to be rejected for recognition.

The technical solutions provided in some embodiments of the present disclosure may have the following beneficial effects.

From the above embodiments of the present disclosure, before human-computer interactions, the current text corresponding to the acquired current audio may be obtained according to the acquired current audio, the speech features extracted from the current audio and text features extracted from the current text are semantically classified through the semantic analysis model, and the classification result is obtained, and when the classification result indicates that the current audio is to be rejected for recognition, the recognition of the current audio is rejected.

In the first aspect of the technical solutions of the present disclosure, the speech feature extraction portion, the text feature extraction portion and the classification portion in the semantic analysis model may be taken as three portions independent of one another; compared with extracting both the speech features and the text features only through a network model, some embodiments of the present disclosure can extract the speech features and the text features in parallel based on two portions independent from each other, which can improve a data processing speed of the semantic analysis model; in the second aspect, by analyzing the speech features and the text features at the same time, compared with performing semantic analysis only to the text or speech, some embodiments of the present disclosure can more accurately determine the meaning that the current audio wants to express, so as to make the extracted features more accurate and then determine the accurate classification result, and reduce the probability of false response; in the third aspect, it is unnecessary to respond to the current audio the recognition of which is rejected, which can not only reduce the probability of false response, but also reduce the unnecessary semantic analysis process.

The method for processing information in some embodiments of the present disclosure may be applied to electronic devices. The electronic devices include mobile terminals and fixed terminals. Herein, the mobile terminals include a mobile phone, a notebook computer, a tablet computer, a wearable electronic device, a smart speaker, etc. The fixed terminals include a personal computer, a television, etc.

In some embodiments of the present disclosure, an application for human-computer interactions may be installed on the electronic device. During use, when the application receives an interaction request input by a user, the current audio may be acquired through an audio acquisition component in the electronic device. The current audio may be audio information including a voice request input by the user. The application for human-computer interactions includes a voice assistant.

For example, taking that the electronic device is a smart speaker as an example, the current audio input by the user may be collected by the audio acquisition component in the smart speaker. After the current audio is collected, feature extraction may be performed on the current audio through the speech feature extraction portion in the semantic analysis model to obtain the speech features of the current audio. At the same time, the current text corresponding to the current audio may also be obtained according to a text conversion mechanism through a processor in a smart speaker, and after the current text is obtained, the text feature extraction portion of the semantic analysis model may also be used to extract the features of the current text to obtain the text features of the current text. Semantic classification is performed on the speech features and the text features through the classification portion in the semantic analysis model, to obtain the classification result; when the classification result indicates that the current audio is an audio the recognition of which is rejected, the recognition of the current audio is rejected; when the classification result indicates that the current audio is not the audio the recognition of which is rejected, semantic analysis is performed on the current audio through the processor, to obtain an analysis result, and response information corresponding to the analysis result is output by an audio output component in the smart speaker.

In some embodiments of the present disclosure, the speech features may include phonetic features for characterizing speech information in the current audio, such as a tone feature, a volume feature, and a speech rate feature of the speech information. Herein, after receiving the current audio, the electronic device may also convert, based on a speech recognition technology, the speech information in the current audio from a speech format to a text format to obtain the current text. The current text features may be features related to text content that are extracted from the current text based on the text feature extraction portion in the semantic analysis model. For example, based on an Automatic Speech Recognition (ASR) technology, format conversion may be performed on the speech information contained in the current audio, that is, the speech information contained in the current audio is converted from the speech format to the text format to obtain the current text, and then the text content is extracted through the text feature extraction portion.

In some embodiments, the method may further include the following operations. After acquiring the current audio, the electronic device acquires the current speech from the current audio; the current speech is input into the speech feature extraction portion in the semantic analysis model, and feature extraction is performed on the current speech through the speech feature extraction portion to obtain the speech feature of the current speech. Herein, the speech features may also include semantic features of the current speech contained in the current audio, such as the meaning of the current speech and the length of the current speech. In some embodiments, the speech features include at least one of: a tone feature, an intonation feature, or a speech rate feature.

After the current text is obtained, the current text may be input into the text feature extraction portion in the semantic analysis model, and feature extraction is performed on the current text through the feature extraction portion in the semantic analysis model, to obtain the text features of the current text. Herein, the text feature extraction portion in the semantic analysis model may be built based on a pre-training model. For example, both literal meaning features and context features of the current text may be extracted based on the constructed text feature extraction portion. After the literal meaning features and the context features of the current text are extracted, the literal meaning features, the context features and the speech features may be classified semantically by using the classification portion in the semantic analysis model, and the classification result is obtained.

In some embodiments, after the text features are extracted based on the text feature extraction portion in the semantic analysis model, the text features and the speech features may be classified semantically through the classification portion in the semantic analysis model to obtain classification results. The classification portion in the semantic analysis model may be a classifier constructed according to a pre-processed training set (documents of a predetermined category) through modeling, and it may be built based on a pre-trained deep learning network. For example, the classification portion of the semantic analysis model may be built based on a pre-trained neural network model. The neural network model may include a convolutional neural network (CNN). In some embodiments, it is also possible to use a set test set document to test the performance of the built classifier according to a set test method, and continuously feedback and learn to improve the performance of the classifier.

Herein, the classification portion in the semantic analysis model may be used to perform semantic classification processing on the speech features and the text features to obtain the classification results. The classification results are used for characterizing whether the current audio is a speech that is rejected for recognition; for example, two classification results may be output by the classification portion in the semantic analysis model. The two classification results include: a first classification result that the recognition of the current audio is rejected and a second classification result that the recognition of the current audio is not rejected.

Taking that the speech features and the text features are input into the classification portion of the semantic analysis model to obtain two classification results as an example, probabilities of the two classification results may be obtained, and the classification result with the highest probability is regarded as the final classification result. For example, if the probability of outputting the first classification result is 0.3, and the probability of outputting the second classification result is 0.7, it indicates that the recognition of the current audio is not rejected; if the probability of outputting the first classification result is 0.7, and the probability of outputting the second classification result is 0.3, it indicates that the recognition of the current audio is rejected. Herein, the probability value may be obtained by normalizing, according to a softmax function, values output by the classification portion in the semantic analysis model. When the classification portion of the semantic analysis model is built based on a pre-trained neural network model, the classification portion may be a fully connected layer of the neural network model.

In some embodiments of the present disclosure, before the human-computer interactions, the current text corresponding to the current audio may be obtained according to the acquired current audio, the speech features extracted from the current audio and text features extracted from the current text are semantically classified, based on the semantic analysis model, to obtain the classification result, and when the classification result indicates that the current audio is an audio the recognition of which is rejected, the recognition of the current audio is rejected. In the first aspect, the speech feature extraction portion, the text feature extraction portion and the classification portion in the semantic analysis model may be taken as three portions independent of one another; compared with extracting both the speech features and the text features only through a network model, some embodiments of the present disclosure can extract the speech features and the text features in parallel based on two portions that are independent from each other, which can improve a data processing speed of the semantic analysis model; in the second aspect, by analyzing the speech features and the text features at the same time, compared with performing semantic analysis only on the text or speech, some embodiments of the present disclosure can more accurately determine the meaning that the current audio wants to express by combining the results of speech analysis with the results of text analysis, so as to make the extracted features more accurate and then determine the accurate classification result, and reduce the probability of false response; in the third aspect, it is unnecessary to respond to the current audio the recognition of which is rejected, which can not only reduce the probability of false response, but also reduce the unnecessary semantic analysis process.

In some embodiments, the operation of obtaining the classification result by performing the semantic classification on the speech feature and the text feature through the classification portion in the semantic analysis model may include that:

a speech feature vector for characterizing the speech feature and a text feature vector for characterizing the text feature are spliced to obtain a spliced feature vector that is to be input into the classification portion; and the semantic classification is performed on the spliced feature vector through the classification portion, to obtain the classification result.

Herein, after the speech features and the text features are determined respectively, the speech feature vector for characterizing the speech features and the text feature vector for characterizing the text features may be determined. The speech feature vector and the text feature vector are spliced to obtain the spliced feature vector, and the spliced feature vector is input into the classification portion in the semantic analysis model. The classification portion performs speech classification on the spliced feature vector to obtain a classification result.

Herein, the speech feature vector may be determined as a first feature vector, and the text feature vector may be determined as a second feature vector. In some embodiments of the present disclosure, the first feature vector and the second feature vector may be spliced based on a concat( ) method to obtain the spliced feature vector. Herein, the first feature vector and the second feature vector will not be changed based on the concat( ) method, but only a copy (the spliced feature vector) of the connected first feature vector and second feature vector will be returned; for example, the second feature vector may be spliced at the end of the first feature vector to obtain the spliced feature vector.

For another example, if the first feature vector and the second feature vector are linear vectors, the first feature vector is m-dimensional, and the second feature vector is n-dimensional, the spliced feature vector obtained by splicing the first feature vector and the second feature vector may be a (m+n)-dimensional feature vector. If the first feature vector and the second feature vector are matrix vectors, the feature vector at x-th row and y-th column in the first feature vector may be spliced with the feature vector at x-th row and y-th column in the second feature vector, until all the feature vectors of the first feature vector and the second feature vector are spliced, then the spliced feature vector may be obtained. Herein, m, n, x and y are all positive integers.

In some embodiments, when the dimension of the spliced feature vector is high, the dimension of the spliced feature vector may also be reduced. Dimension reduction is used to compress high-dimensional arrays into low-dimensional arrays. Herein, the dimension of the spliced feature vector may be reduced based on a set dimension reduction algorithm. The set dimension reduction algorithm includes at least one of the following: a linear reduction algorithm, a principal component analysis (PCA) algorithm, a multiple dimensional scaling (MDS) algorithm, a linear discriminant analysis (LDA) algorithm, or a locally linear embedding (LLE) algorithm.

Taking that the dimension of the spliced feature vector is reduced linearly based on the linear dimensionality reduction algorithm as an example, the spliced feature vector may be mapped to a dimension space with a lower dimension than the spliced feature vector by performing linear transformation on the spliced feature vector. For example, if the spliced feature vector X is determined to be d-dimensional, then the d-dimensional X may be reduced according to a linear transformation formula to obtain a d'-dimensional target feature vector X'. Herein, d' is less than d, and features in the obtained target feature vector X' are linear combinations of the features in the spliced feature vector X. The linear transformation formula is:

$$X'=WTX \qquad (1)$$

In formula (1), W is a transformation matrix, X is the spliced feature vector, and X' is the target feature vector. The transformation matrix W may be viewed as d' d-dimensional base vectors.

In some embodiments, when the classification portion in the semantic analysis model is built based on the pre-trained neural network model, the spliced feature vector may be input into the classification portion of the CNN and classified by using the classification portion of the CNN. For example, the spliced feature vector is input into the fully connected layer of the CNN for weighted summation, and a result of weighted summation is input into the softmax function, and a value output by the softmax function is normalized to obtain the probability value that characterizes the classification result.

In some embodiments, the method may further include that:

the speech feature vector for characterizing the speech features is obtained according to a vector transformation mechanism in the speech feature extraction portion;

convolution operation is performed between a convolution kernel of the speech feature extraction portion and the speech feature vector, to obtain a convolution operation value; and a feature vector of the speech feature is extracted by processing the convolution operation value through a pooling layer of the speech feature extraction portion.

Herein, when the speech feature extraction portion in the semantic analysis model is built based on the pre-trained CNN, the speech feature vector obtained based on the vector transformation mechanism may be input into a convolutional layer of the speech feature extraction portion. Convolution operation is performed between the convolution kernel of the convolutional layer and the speech feature vector, to obtain the convolution operation value. For example, the size of the convolution kernel may be set in advance, and then a convolution operation is performed between the convolution kernel and the speech feature vector of a region as large as the convolution kernel, after the convolution operation is performed between the convolution kernel and the speech feature vector in the region as large as the convolution kernel, move to other areas to perform calculation, until all the speech feature vectors are covered. In such a manner, the convolution operation value may be obtained through the set convolution kernel. After the convolution operation value is obtained, the convolution operation value may be maximally pooled through the pooling layer of the speech feature extraction portion to obtain the speech feature vector with the largest amount of information, so as to extract the speech feature vector of the speech feature. In some embodiments of the present disclosure, the speech feature vector may be extracted from the speech features based on the CNN, and the extracted speech feature vector may be used as a basis for classification, which can improve the intelligence and accuracy of rejection of audio recognition.

In some embodiments, the text feature may include: a literal meaning feature and a context feature of the current text.

The operation of performing feature extraction on the current text through the text feature extraction portion in the semantic analysis model to obtain the text feature of the current text may include that:

semantic analysis is performed on each word in the current text through the semantic analysis model to obtain the literal meaning feature of the word; and the context feature is obtained by extracting a feature from an adjacent text of the current text through the text feature extraction portion.

Herein, the literal meaning feature of the current text refers to semantic information carried by literal meanings of words contained in the current text. For example, if the current text is "This apple is really good", then it can be determined that the word "apple" may refer to either a fruit or iPhone based on the semantic information carried by the literal meanings of the words in the current text; if the current text is "This apple tastes good", then it can be determined that the word "apple" may refer to a fruit based on the semantic information carried by the literal meanings of the words in the current text; and if the current text is "This apple really works", then it can be determined that the word "apple" may refer to iPhone based on the semantic information carried by the literal meanings of the words in the current text. The context of the current text may refer to the text adjacent to the current text. For example, if the current position of the current text is m, the above of the current text may refer to the (m−n)-th text, and the following may refer to the (m+n)-th text, where m and n are positive integers. Herein, the current text and the context of the current text may be a sentence, a word, or a character. For example, the current text is "How is the weather", the above of the current text is "today", and the following is "What is appropriate to wear".

Herein, before the semantic analysis is performed on each word in the current text based on the semantic analysis model, the current text may be segmented based on set word segmentation algorithms to obtain the text content represented based on words. For example, if the current text contains "Nice weather today," a result of segmenting the current text may be "today weather nice". The set word segmentation algorithms include at least one of the following: string matching based word segmentation algorithm, understanding based word segmentation algorithm, or statistics based word segmentation algorithm.

After the current text is segmented based on the set word segmentation algorithm, the text content containing at least one word may be obtained. At this time, the words contained in the text content may be processed based on the semantic analysis model to obtain the literal meaning features of the words in the current text. Herein, when the current text is acquired, the feature extracted from the adjacent text of the current text by the text feature extraction portion may also be acquired as the context feature, and the context feature is processed based on the semantic analysis model to obtain a context feature vector. In some embodiments of the present disclosure, by acquiring the literal meaning features and the context features of the current text, and analyzing the literal meaning features and the context features, compared with performing the semantic analysis only on the literal meaning features of the current text, the language environment of the current text can be determined based on the context of the current text, and then the meaning of the current text can be accurately determined, so as to make the extracted features more accurate, and then to determine the accurate classification result, which reduces the probability of false response.

In some embodiments, the method may further include that:

a knowledge data feature is obtained by determining knowledge data associated with the current text from a knowledge graph based on the current text; and semantic classification is performed on the speech feature, the text feature and the knowledge data feature through the classification portion, to obtain a classification result.

Because the current text may represent multiple meanings, in some embodiments of the present disclosure, the meanings that the current text may represent (i.e., the candidate texts) may be fully presented based on the knowledge graph. At this time, relevancy between the current text and each of the candidate texts may be determined, and a candidate text (knowledge data) with the highest relevancy may be determined, and then knowledge data features may be obtained. After obtaining the knowledge data features, the classification portion of the semantic analysis model may be used to classify semantically the feature vectors for characterizing the literal meaning features and the context features, the speech feature vectors and the knowledge data features, to obtain the classification results. In some embodiments of the present disclosure, by introducing the knowledge graph, the diversity of the extracted features can be increased, and effects on the final classification result due to too simple extracted features can be reduced.

In some embodiments, the operation of performing the semantic classification on the speech feature, the text feature and the knowledge data feature through the classification portion to obtain the classification result may include that:

the speech feature vector for characterizing the speech feature, the text feature vector for characterizing the text feature, and a knowledge feature vector corresponding to the knowledge data are spliced to obtain a target feature vector that is to be input into the semantic analysis model; and semantic classification processing is performed on the target feature vector through the classification portion in the semantic analysis model to obtain the classification result.

In some embodiments of the present disclosure, the speech feature vector, the text feature vector and the knowledge feature vector may be spliced based on the concat (method to obtain the target feature vector. Based on the concat (method, the speech feature vector, the text feature vector and the knowledge feature vector will not be changed, but only a copy (i.e., the target feature vector) of the connected speech feature vector, text feature vector and knowledge feature vector will be returned. For example, the text feature vector may be spliced at the end of the speech feature vector, and the knowledge feature vector may be spliced at the end of the text feature vector, so as to obtain the target feature vector.

Figure 2A:
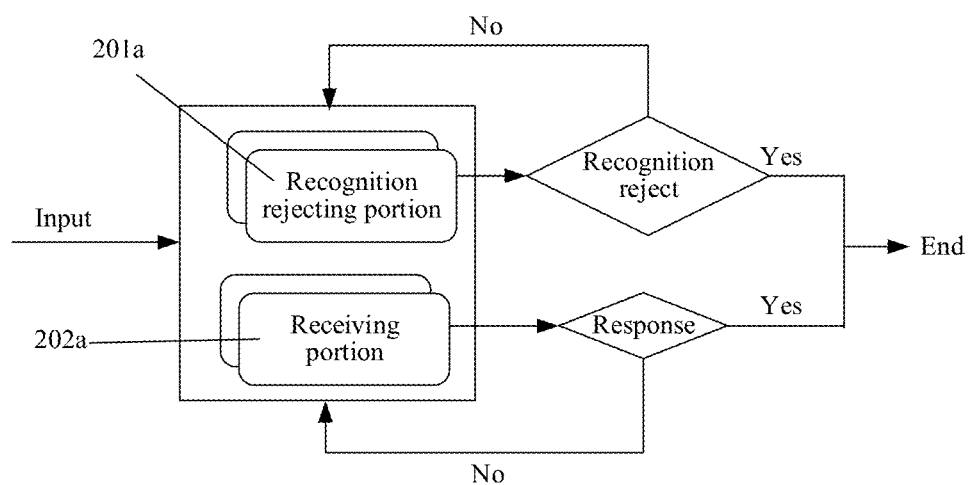
FIG. 2A is a flowchart of another method for processing information according to some embodiments of the present disclosure.

FIG. 2A is a flowchart of another method for processing information according to some embodiments of the present disclosure. As illustrated in FIG. 2A, the current audio may be input into a recognition rejecting portion 201a and a receiving portion 202a. Whether to reject to recognize the current audio is determined based on the recognition rejecting portion 201a, and when the recognition rejecting portion 201a determines that the recognition of the current audio is rejected, the recognition of the current audio is rejected. Whether to respond to the current audio is determined based on the receiving portion 202a, and when the receiving portion 202a determines to respond to the current audio, the semantic analysis may be performed on the current audio, and corresponding response information is determined according to the analysis result.

Figure 2B:
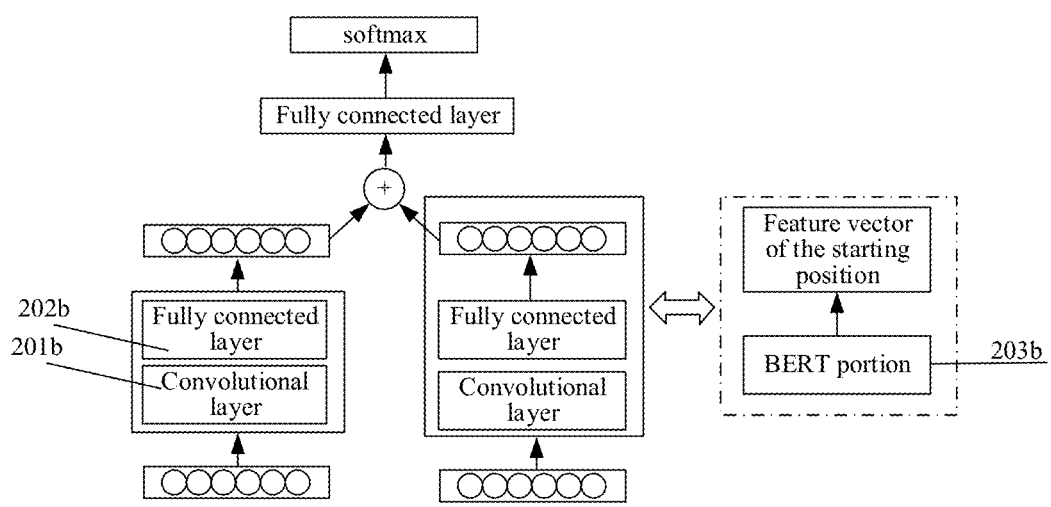
FIG. 2B is a structure diagram of a model according to some embodiments of the present disclosure.

FIG. 2B is a structure diagram of a model according to some embodiments of the present disclosure. As illustrated in FIG. 2B, in some embodiments of the present disclosure, the feature extraction portion in the first CNN may be used as the speech feature extraction portion. Herein, the first CNN includes a convolutional layer 201b and a pooling layer 202b. In the process of speech feature extraction, the speech feature vector for characterizing the speech feature may be input into the convolutional layer 201b of the first CN and convolved with the convolution kernel of the convolutional layer 201b to obtain the convolution operation value, and the convolution operation value is input into the pooling layer 202b of the first CNN to be maximally pooled to obtain the speech feature vector with the most information, so as to extract the speech feature vector for characterizing the speech feature.

In some embodiments of the present disclosure, the convolutional layer and the pooling layer in the second CNN may be replaced with a BERT model 203b. The BERT model 203b is used as the text feature extraction portion of the semantic analysis model. In the implementation process, feature extraction is performed on the current text through the BERT model 203b to obtain the text feature vector corresponding to the current text, and the feature vector of the starting position output by the BERT model 203b is determined as the extracted text feature vector. In some embodiments, the classification portions of the first CNN, the second CNN, or the third CNN different from the first CNN and the second CNN may also be taken as the classification portions of the semantic analysis model to constitute the semantic analysis model together.

In some embodiments of the present disclosure, after the speech feature vector, the text feature vector and the knowledge feature vector are extracted, the extracted speech feature vector, text feature vector and knowledge feature vector may be spliced to obtain the target feature vector, and the target feature vector is input into the classification portion, and classified by using the classification portion. For example, the target feature vector is input into the fully connected layer of the classification portion for weighted summation, the weighted summation results are input into the softmax function, and a value output by the softmax function is normalized to obtain the probability value for characterizing the classification result.

In some embodiments, the information processing method can be applied to multiple application scenarios, such as identifying users, adjusting the playing of music, adjusting the playing of video, and adjusting the playing of radio. In various scenarios, the number of speech requests from users will reach a high level, but not all the received speech requests are actually what the user wants. There may be false awakenings, irrelevant speeches, and users' unconscious self-talk, etc. Invalid speech requests account for up to 10%.

Figure 3:
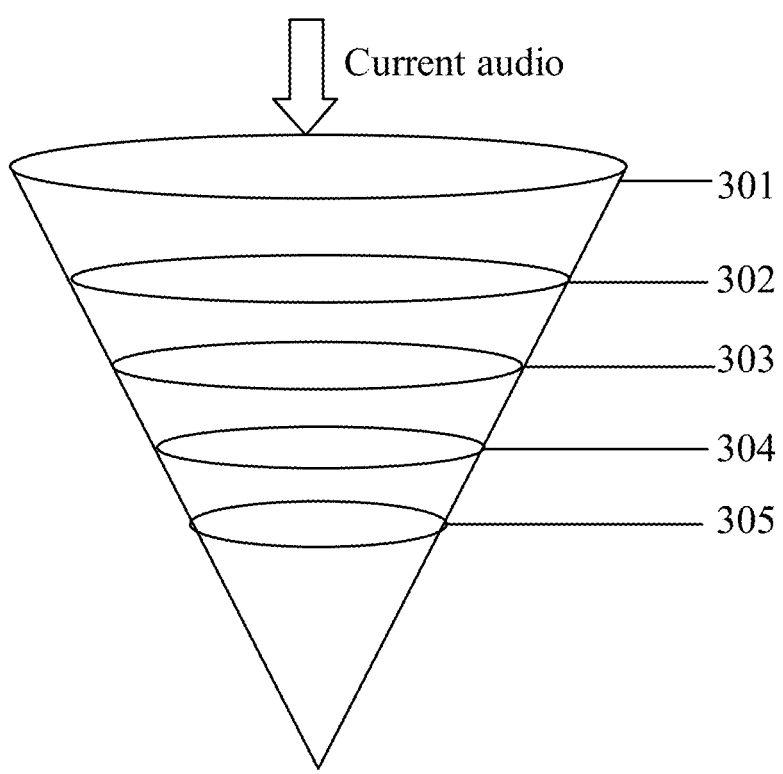
FIG. 3 is a schematic diagram of dimensions involved in a method for processing information according to some embodiments of the present disclosure.

FIG. 3 is a schematic diagram of dimensions involved in an information processing method according to some embodiments of the present disclosure. As illustrated in FIG. 3, after the current audio is input into a Voice Activity Detection (VAD) portion 301, non-human voices may be filtered out based on a VAD technology; then, the current audio, the non-human voices of which are filtered out, is input into a voice print recognition rejecting portion 302 for voice print authentication, and the recognition of the current audio is rejected when the voice print authentication fails. When the voice print authentication is successful, the current audio authenticated successfully is input into an ASR recognition rejecting portion 303, and unclear audio information with confidence lower than the set confidence is filtered out based on the ASR recognition rejecting portion 303. The current audio filtered based on the ASR recognition rejecting portion 303 is input into a speech recognition rejecting portion 304 and a semantic recognition rejecting portion 305, and irrelevant audio information, meaningless audio information and unintentional audio information are filtered out based on the speech recognition rejecting portion 304 and the semantic recognition rejecting portion 305; in this way, a recognition rejection/response result can be obtained. In some embodiments, these recognition rejecting portions may be connected in series. FIG. 4 is a schematic diagram of recognition reject/response results obtained based on an audio file according to some embodiments of the present disclosure.

Figure 5:
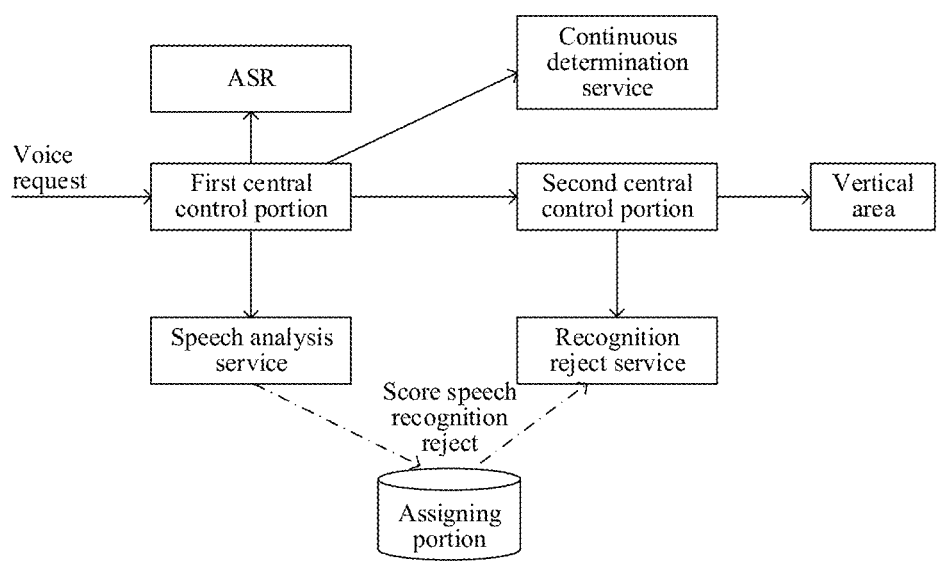
FIG. 5 is an overall architecture diagram of full duplex according to some embodiments of the present disclosure.

FIG. 5 is an overall architecture diagram of full duplex according to some embodiments of the present disclosure. As illustrated in FIG. 5, the speech request may be input into a first central control module, and the ASR, a speech analysis service and a continuous determination service are performed on the speech request through the first central control module. After that, the speech request is input into a second central control module, and a recognition reject service is performed on the voice request through the second central control module, and the voice request is classified in different vertical areas. In some embodiments of the present disclosure, speech recognition reject may also be scored based on an output result of the speech analysis service, and the speech request may be assigned to the recognition reject service of the second central control portion based on a score result.

In some embodiments of the present disclosure, by setting the recognition rejecting portion, the problem about whether to respond to the user can be solved, and on the basis of being able to listen clearly, understandably, and the result meeting the user's needs, it is more intelligent to avoid disorderly speaking. In some embodiments, through log mining, it is found that in the application scenario of continuous dialog, irrelevant human voice accounts for about 15%. Based on the technical solutions proposed in some embodiments of the present disclosure, the input of irrelevant human voice can be reduced, and the recognition rejecting portion mentioned in some embodiments of the present disclosure can also reduce the probability of false awakenings.

Figure 6:
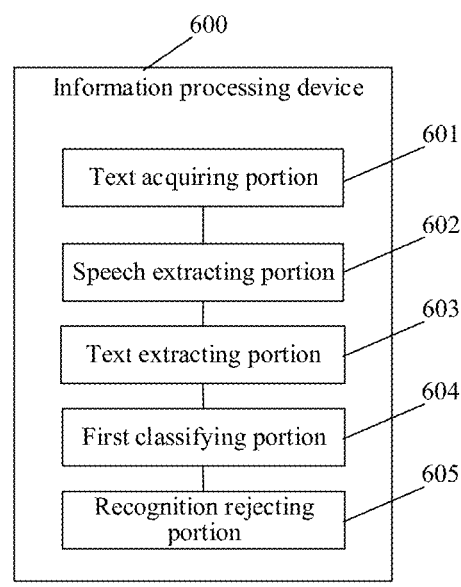
FIG. 6 is a block diagram of a device for processing information according to some embodiments of the present disclosure.

FIG. 6 is a block diagram of a device for processing information according to some embodiments of the present disclosure. As shown in FIG. 6, the device is applied to an electronic device. The information processing device 600 may mainly include a text acquiring portion 601, a speech extracting portion 602, a text extracting portion 603, a first classifying portion 604, and a recognition rejecting portion 605.

The text acquiring portion 601 is configured to acquire a current audio, and acquire a current text corresponding to the current audio.

The speech extracting portion 602 is configured to perform feature extraction on the current audio through the speech feature extraction portion in the semantic analysis model, to obtain a speech feature of the current audio.

The text extracting portion 603 is configured to perform feature extraction on the current text through the text feature extraction portion in the semantic analysis model, to obtain a text feature of the current text.

The first classifying portion 604 is configured to perform semantic classification on the speech feature and the text feature through a classification portion in the semantic analysis model, to obtain a classification result.

The recognition rejecting portion 605 is configured to reject to recognize the current audio in response to the classification result indicating that the current audio is to be rejected for recognition.

In some embodiments, the first classifying portion 604 may include:

a splicing subportion, configured to splice a speech feature vector for characterizing the speech feature and a text feature vector for characterizing the text feature, to obtain the spliced feature vector that is to be input into the classification portion; and a classifying subportion, configured to perform the semantic classification on the spliced feature vector through the classification portion, to obtain the classification result.

In some embodiments, the speech feature includes at least one of: a tone feature, an intonation feature, or a speech rate feature.

In some embodiments, the device 600 may further include:

a transforming portion, configured to obtain a speech feature vector for characterizing the speech feature according to a vector transformation mechanism in the speech feature extraction portion;

a convolution calculation portion, configured to perform convolution calculation between a convolution kernel of the speech feature extraction portion and the speech feature vector, to obtain the convolution operation value; and an extracting portion, configured to extract a feature vector of the speech feature by processing the convolution operation value through a pooling layer of the speech feature extraction portion.

In some embodiments, the text feature may include: a literal meaning feature and a context feature of the current text.

The text extracting portion 603 may include:

an analyzing subportion, configured to perform semantic analysis on each word in the current text through the semantic analysis model, to obtain a literal meaning feature of the word;

an extracting subportion, configured to obtain the context feature by extracting a feature from the adjacent text of the current text through the text feature extraction portion.

In some embodiments, the device 600 may further include:

a determining portion, configured to determine a knowledge data feature by determining knowledge data associated with the current text from a knowledge graph based on the current text; and a second classifying portion, configured to perform semantic classification on the speech feature, the text feature and the knowledge data feature, through the classification portion, to obtain the classification result.

With regard to the device in the above embodiments, the specific mode of each portion performing operations has been described in detail in some embodiments of the method, so it will not be repeated here.

Figure 7:
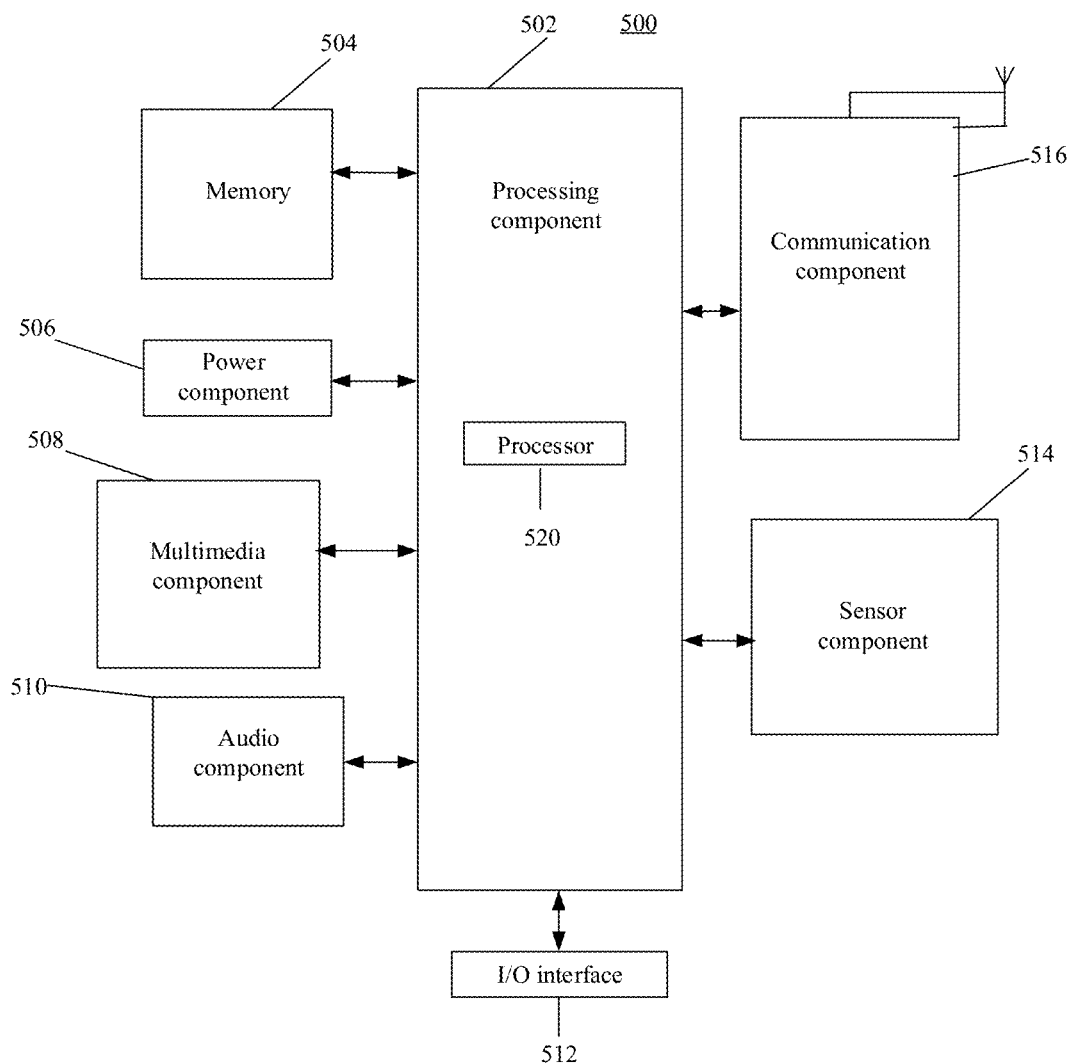
FIG. 7 is a block diagram of a hardware structure of a device for processing information according to some embodiments of the present disclosure.

FIG. 7 is a block diagram of a hardware structure of a device for processing information according to some embodiments of the present disclosure. For example, the device 500 may be a mobile phone, a computer, a digital broadcast terminal, a messaging device, a gaming console, a tablet, a medical device, exercise equipment and a personal digital assistant.

Referring to FIG. 7, the device 500 may include one or more of the following components: a processing component 502, a memory 504, a power component 506, a multimedia component 508, an audio component 510, an Input/Output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the above method. Moreover, the processing component 502 may include one or more modules which facilitate interaction between the processing component 502 and the other components. For instance, the processing component 502 may include a multimedia module to facilitate interaction between the multimedia component 508 and the processing component 502.

The memory 504 is configured to store various types of data to support the operation of the device 500. Examples of such data include instructions for any application or method operated on the device 500, contact data, phonebook data, messages, pictures, video, etc. The memory 504 may be implemented by any type of volatile or non-transitory memory, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 506 provides power for various components of the device 500. The power component 506 may include a power management system, one or more power supplies, and other components associated with generation, management and distribution of power for the device 500.

The multimedia component 508 includes a screen for providing an output interface between the device 500 and a user. In some embodiments, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 508 includes a front camera and/or a rear camera. The front camera and/or the rear camera may receive external multimedia data when the device 500 is in an operation mode, such as a photographing mode or a video mode. Each of the front camera and the rear camera may be a fixed optical lens system or have focusing and optical zooming capabilities.

The audio component 510 is configured to output and/or input an audio signal. For example, the audio component 510 includes a Microphone (MIC), and the MIC is configured to receive an external audio signal when the device 500 is in the operation mode, such as a call mode, a recording mode and a speech recognition mode. The received audio signal may further be stored in the memory 504 or sent through the communication component 516. In some embodiments, the audio component 510 further includes a speaker configured to output the audio signal.

The I/O interface 512 provides an interface between the processing component 502 and a peripheral interface module. The peripheral interface module may be a keyboard, a click wheel, a button, etc. The button may include, but not limited to: a home button, a volume button, a starting button and a locking button.

The sensor component 514 includes one or more sensors configured to provide status assessment in various aspects for the device 500. For instance, the sensor component 514 may detect an on/off status of the device 500 and relative positioning of components, such as a display and small keyboard of the device 500, and the sensor component 514 may further detect a change in a position of the device 500 or a component of the device 500, presence or absence of contact between the user and the device 500, orientation or acceleration/deceleration of the device 500 and a change in temperature of the device 500. The sensor component 514 may include a proximity sensor configured to detect presence of an object nearby without any physical contact. The sensor component 514 may also include a light sensor, such as a Complementary Metal Oxide Semiconductor (CMOS) or Charge Coupled Device (CCD) image sensor, configured for use in an imaging application. In some embodiments, the sensor component 514 may also include an acceleration sensor, a gyroscope sensor, a magnetic sensor, a pressure sensor or a temperature sensor.

The communication component 516 is configured to facilitate wired or wireless communication between the device 500 and another device. The device 500 may access a communication-standard-based wireless network, such as WI-FI, 2G, 3G, 4G, or 5G network or a combination thereof. In some embodiments of the present disclosure, the communication component 516 receives a broadcast signal or broadcast associated information from an external broadcast management system through a broadcast channel. In some embodiments of the present disclosure, the communication component 516 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the device 500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above method.

In some embodiments of the present disclosure, there is also provided a non-transitory computer-readable storage medium including an instruction, such as the memory 504 including an instruction, and the instruction may be executed by the processor 520 of the device 500 to implement the abovementioned method. For example, the non-temporary computer-readable storage medium may be a Read-Only Memory (ROM), a Random Access Memory (RAM), a Compact Disc Read-Only Memory (CD-ROM), a magnetic tape, a floppy disc, an optical data storage device and the like.

A non-transitory computer-readable storage medium is provided. When an instruction in the storage medium is executed by the processor of the information processing device, the information processing device can perform the information management method. The method is applied to an electronic device, and may include that:

a current audio is acquired, and a current text corresponding to the current audio is acquired;

feature extraction is performed on the current audio through a speech feature extraction portion in the semantic analysis model, to obtain a speech feature of the current audio;

feature extraction is performed on the current text through a text feature extraction portion in the semantic analysis model, to obtain a text feature of the current text;

semantic classification is performed on the speech feature and the text feature through a classification portion in the semantic analysis model, to obtain a classification result; and recognition of the current audio is rejected in response to the classification result indicating that the current audio is to be rejected for recognition.

The various device components, modules, units, blocks, circuits, or portions may have modular configurations, or are composed of discrete components, but nonetheless can be referred to as "modules" or "portions" in general. In other words, the "components," "modules," "blocks," "circuits," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for processing information, implemented by an electronic device and applied to audio interaction scenarios, the method comprising:
   acquiring, by an audio acquisition component in the electronic device, an audio, and acquiring, by a processor in the electronic device, a text corresponding to the audio;
   performing, by the processor, feature extraction on the audio through a speech feature extraction portion in a semantic analysis model, to obtain a speech feature of the audio;
   performing, by the processor, feature extraction on the text through a text feature extraction portion in the semantic analysis model, to obtain a text feature of the text;
   performing, by the processor, semantic classification on the speech feature and the text feature through a classification portion in the semantic analysis model, to obtain a classification result; and
   rejecting, by the processor, to recognize the audio in response to the classification result indicating that the audio is to be rejected for recognition, and
   performing, by the processor, semantic analysis on the audio to obtain an analysis result in response to the classification result indicating that the audio is not to be rejected for recognition, and outputting, by an audio output component in the electronic device, response information corresponding to the analysis result,
   wherein the performing semantic classification on the speech feature and the text feature through the classification portion in the semantic analysis model, to obtain the classification result comprises:
   splicing a speech feature vector for charactering the speech feature and a text feature vector for charactering the text feature, to obtain a spliced feature vector that is to be input into the classification portion; and
   performing the semantic classification on the spliced feature vector through the classification portion, to obtain the classification result.

2. The method of claim 1, wherein the speech feature comprises at least one of: a tone feature, an intonation feature, or a speech rate feature.

3. The method of claim 1, further comprising:
   obtaining a speech feature vector for charactering the speech feature according to a vector transformation mechanism in the speech feature extraction portion;
   performing convolution calculation between a convolution kernel of the speech feature extraction portion and the speech feature vector, to obtain a convolution operation value; and
   extracting a feature vector of the speech feature by processing the convolution operation value through a pooling layer of the speech feature extraction portion.

4. The method of claim 1, wherein
   the text feature comprises: a literal meaning feature and a context feature of the text;
   the performing feature extraction on the text through the text feature extraction portion in the semantic analysis model, to obtain the text feature of the text comprises:
   performing semantic analysis on each word in the text through the semantic analysis model to obtain a literal meaning feature of the word; and
   obtaining the context feature by extracting a feature from an adjacent text of the text through the text feature extraction portion.

5. The method of claim 4, further comprising:
   obtaining a knowledge data feature by determining knowledge data associated with the text from a knowledge graph based on the text; and
   performing semantic classification on the speech feature, the text feature and the knowledge data feature through the classification portion, to obtain the classification result.

6. A smart electronic device implementing the method of claim 1, wherein
   the current text corresponding to the current audio is obtained according to the acquired current audio prior to interactions between the smart electronic and the user; and
   the semantic analysis model comprises three independent portions, including a speech feature extraction portion, a text feature extraction portion, and a classification portion, such that the speech features and the text features are extracted in parallel based on the independent speech feature extraction portion and the text feature extraction portion, thereby improving a data processing speed of the semantic analysis model.

7. The smart electronic device of claim 6, wherein the smart electronic device is configured to analyze the speech features and the text features at a same time, to thereby more accurately determine what the current audio wants to express by combining results of speech analysis with results of text analysis, improve accuracy of extracted features and the classification result, and reduce probability of false response and unnecessary semantic analysis process.

8. An electronic device for processing information, comprising:
a processor; and
memory storing instructions executable by the processor, wherein the processor is configured to:
acquire, through an audio acquisition component, an audio, and acquire a text corresponding to the audio;
perform feature extraction on the audio through a speech feature extraction portion in a semantic analysis model, to obtain a speech feature of the audio;
perform feature extraction on the text through a text feature extraction portion in the semantic analysis model, to obtain a text feature of the text;
perform semantic classification on the speech feature and the text feature through a classification portion in the semantic analysis model, to obtain a classification result; and
reject to recognize the audio in response to the classification result indicating that the audio is to be rejected for recognition, and
perform semantic analysis on the audio to obtain an analysis result in response to the classification result indicating that the audio is not to be rejected for recognition, and output, through an audio output component, response information corresponding to the analysis result,
wherein the processor is further configured to:
splice a speech feature vector for characterizing the speech feature and a text feature vector for characterizing the text feature, to obtain a spliced feature vector that is to be input into the classification portion; and
perform the semantic classification on the spliced feature vector through the classification portion, to obtain the classification result.

9. The device of claim 8, wherein the speech feature comprises at least one of: a tone feature, an intonation feature, or a speech rate feature.

10. The device of claim 8, wherein the processor is further configured to:
obtain a speech feature vector for characterizing the speech feature according to a vector transformation mechanism in the speech feature extraction portion;
perform convolution calculation between a convolution kernel of the speech feature extraction portion and the speech feature vector, to obtain a convolution operation value; and
extract a feature vector of the speech feature by processing the convolution operation value through a pooling layer of the speech feature extraction portion.

11. The device of claim 8, wherein
the text feature comprises: a literal meaning feature and a context feature of the text; and
the processor is further configured to:
perform semantic analysis on each word in the text through the semantic analysis model, to obtain a literal meaning feature of the word; and
obtain the context feature by extracting a feature from an adjacent text of the text through the text feature extraction portion.

12. The device of claim 11, wherein the processor is further configured to:
determine a knowledge data feature by determining knowledge data associated with the text from a knowledge graph based on the text; and
perform semantic classification on the speech feature, the text feature and the knowledge data feature through the classification portion, to obtain the classification result.

13. A non-transitory computer-readable storage medium having stored therein instructions that, when executed by a processor of an electronic device for processing information, cause the device to perform operations comprising:
acquiring, by an audio acquisition component in the electronic device, an audio, and acquiring, by a processor in the electronic device, a text corresponding to the audio;
performing, by the processor, feature extraction on the audio through a speech feature extraction portion in a semantic analysis model, to obtain a speech feature of the audio;
performing, by the processor, feature extraction on the text through a text feature extraction portion in the semantic analysis model, to obtain a text feature of the text;
performing, by the processor, semantic classification on the speech feature and the text feature through a classification portion in the semantic analysis model, to obtain a classification result; and
rejecting, by the processor, to recognize the audio in response to the classification result indicating that the audio is to be rejected for recognition, and
performing, by the processor, semantic analysis on the audio to obtain an analysis result in response to the classification result indicating that the audio is not to be rejected for recognition, and outputting, by an audio output component in the electronic device, response information corresponding to the analysis result,
wherein the performing semantic classification on the speech feature and the text feature through the classification portion in the semantic analysis model, to obtain the classification result comprises:
splicing a speech feature vector for charactering the speech feature and a text feature vector for charactering the text feature, to obtain a spliced feature vector that is to be input into the classification portion; and
performing the semantic classification on the spliced feature vector through the classification portion, to obtain the classification result.

14. The non-transitory computer-readable storage medium of claim 13, wherein the speech feature comprises at least one of: a tone feature, an intonation feature, or a speech rate feature.

15. The non-transitory computer-readable storage medium of claim 13, wherein the operations further comprise:
obtaining a speech feature vector for charactering the speech feature according to a vector transformation mechanism in the speech feature extraction portion;
performing convolution calculation between a convolution kernel of the speech feature extraction portion and the speech feature vector, to obtain a convolution operation value; and
extracting a feature vector of the speech feature by processing the convolution operation value through a pooling layer of the speech feature extraction portion.

16. The non-transitory computer-readable storage medium of claim 13, wherein the text feature comprises: a literal meaning feature and a context feature of the text;
performing feature extraction on the text through the text feature extraction portion in the semantic analysis model, to obtain the text feature of the text comprises:

performing semantic analysis on each word in the text through the semantic analysis model to obtain a literal meaning feature of the word; and obtaining the context feature by extracting a feature from an adjacent text of the text through the text feature extraction portion.

17. The non-transitory computer-readable storage medium of claim 16, wherein the operations further comprise:

obtaining a knowledge data feature by determining knowledge data associated with the text from a knowledge graph based on the text; and performing semantic classification on the speech feature, the text feature and the knowledge data feature through the classification portion, to obtain the classification result.

\* \* \* \* \*